United States Patent [19]
Kaku et al.

[11] Patent Number: 5,563,908
[45] Date of Patent: Oct. 8, 1996

[54] MODULATOR AND DEMODULATOR APPARATUS

[75] Inventors: Takashi Kaku; Noboru Kawada, both of Kawasaki, Japan

[73] Assignee: Fujitsu Limited, Kawasaki, Japan

[21] Appl. No.: 472,291

[22] Filed: Jun. 7, 1995

Related U.S. Application Data

[62] Division of Ser. No. 108,547, Aug. 19, 1993.

[30] Foreign Application Priority Data

Feb. 18, 1993 [JP] Japan ..................... 5-029369

[51] Int. Cl.⁶ .................................................. H04B 1/38
[52] U.S. Cl. ......................................... 375/222; 455/38.5
[58] Field of Search .................................. 375/219, 222, 375/369, 377, 298, 303; 379/97, 100; 455/35.1, 36.1, 38.3, 38.5; 370/110.2; 332/100, 103

[56] References Cited

U.S. PATENT DOCUMENTS

| | | | |
|---|---|---|---|
| 3,510,777 | 5/1970 | Gordon | 455/38.5 |
| 4,161,734 | 7/1979 | Anderson | 342/352 |
| 4,471,489 | 9/1984 | Konetski et al. | 379/93 |
| 4,694,469 | 9/1987 | Kaku et al. | 375/231 |
| 4,766,599 | 8/1988 | Miyazaki | 375/222 |
| 4,799,254 | 1/1989 | Dayton et al. | 379/97 |
| 4,860,308 | 8/1989 | Kamerman et al. | 375/222 |
| 4,939,767 | 7/1990 | Saito et al. | 379/100 |
| 5,023,903 | 6/1991 | Bowen | 379/67 |
| 5,048,054 | 9/1991 | Eyuboglu et al. | 375/222 |
| 5,095,494 | 3/1992 | Takahashi et al. | 375/224 |

FOREIGN PATENT DOCUMENTS

| | | | |
|---|---|---|---|
| 0061316 | 9/1982 | European Pat. Off. | 375/222 |
| 0204308 | 12/1986 | European Pat. Off. | |
| 2275395 | 8/1994 | United Kingdom | 375/222 |

*Primary Examiner*—Young T. Tse
*Attorney, Agent, or Firm*—Staas & Halsey

[57] ABSTRACT

The invention provides a modulator and demodulator apparatus (modem) which modulates and demodulates a signal in a main channel, for main data, and a secondary channel, for secondary data obtained by frequency division, and which includes a carrier detection unit for detecting a carrier from a demodulation signal and executes a data processing sequence for the demodulation signal in accordance with a result of detection by the carrier detection unit. This apparatus can detect a carrier of a low roll-off ratio accurately and stably without a dispersion in detection time and, consequently, data of a demodulation signal can be processed with certainty. The modulator and demodulator apparatus comprises a filter having a characteristic wherein the time axis response is slow and it is provided at a stage preceding the carrier detection unit so that a demodulation signal which has passed through the filter is input to the carrier detection unit. The modulator and demodulator apparatus includes a modulation unit for modulating and transmitting data having a turnoff sequence with a last end and a demodulation unit for receiving and demodulating a receive signal to reproduce data. The modulation unit includes a tone signal generation unit for adding a tone signal to the last end of the turnoff sequence of the data to be transmitted.

4 Claims, 12 Drawing Sheets

100% COS² FILTER OUTPUT

2 SYMBOLS
1 SYMBOL

2 SYMBOLS
1 SYMBOL

CDI ON OFF

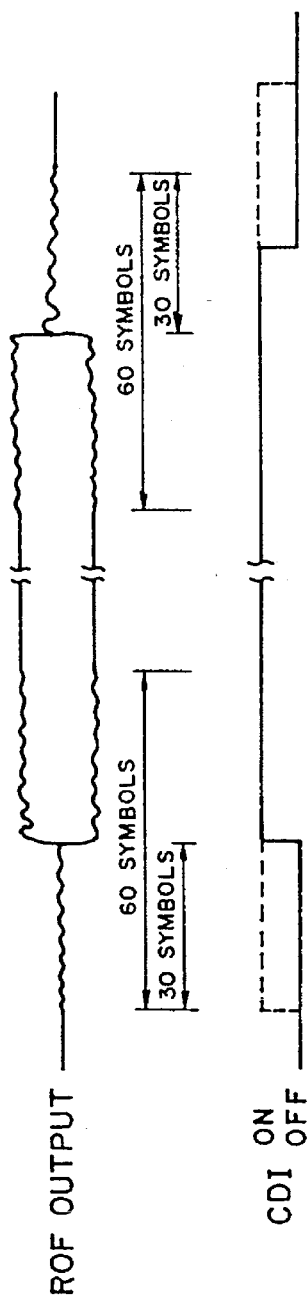

5,563,908

MODULATOR AND DEMODULATOR APPARATUS

This application is a division of application Ser. No. 08/108,547, filed Aug. 19, 1993, now pending

BACKGROUND OF THE INVENTION

This invention relates to a modulator and demodulator apparatus (modem) which modulates and in demodulates a signal in a main channel for main data and a secondary channel for secondary data obtained by frequency division. More particularly this invention relates to a modulator and demodulator apparatus of the type mentioned which includes a carrier detector for detecting a carrier from a demodulation signal and executing a data processing sequence for a demodulation signal in accordance with a detection by the carrier detector.

FIG. 12 shows a general construction of an on-line system. Referring to FIG. 12, in the on-line system shown, a plurality of modems 203 are connected to a host computer 201 by way of a communication control apparatus (CCP) 202. Each of the modems 203 is connected by way of an analog circuit transmission lines 204 to a corresponding one of other modems 203' installed at another location. A terminal 205 is connected to each of the modems 203'.

The on-line system further includes a network supervisory apparatus 206, for which a secondary channel is used.

A state signal of a modem can be transmitted, from each of the host side modems 203 shown in FIG. 12, straight to the network supervisory apparatus 206. However, from each of the terminal side modems 203', a state signal thereof is transmitted to the associated host side modem 203 and then to the network supervisory apparatus 206.

Since a state signal of a modem must necessarily be transmitted without having any influence on main data, each of the modems 203 and 203' divides, for example, a voice band of 0.3 kHz to 3.4 kHz by frequency division. This provide a secondary channel for secondary data and a main channel for main data as seen in FIG. 13.

Phase shift keying (PSK), orthogonal amplitude modulation (QAM) or some other modulation is used for a main signal while frequency shift keying (FSK) is used for a secondary signal.

In each of the modems 203 and 203' described above, main data and secondary data are demodulated separately, and each of demodulation signals is input to a roll-off filter (band separation filter) 207 as shown in FIG. 14. The roll-off filter 207 only passes a signal within a predetermined frequency range of the demodulation signal (a digital output of a demodulator not shown). The roll-off ratio of such roll-off filter 207 is set to one of such values as 15%, 50% and 100%.

The signal having passed the roll-off filter 207 is sent as data to an automatic gain control section (AGC), not shown, or the like. Additionally, it is also input, as shown in FIG. 14, to a carrier detection section (CD section) 208. The carrier detection section 208 detects a carrier from the signal having passed the roll-off filter 207 to determine whether or not data have been received, a result of such detection (CDI-ON/ OFF: presence/absence of a carrier) is supplied as trigger information to a sequencer not shown so that a data processing sequence of the demodulation signal is executed by the sequencer. The CDI-ON (carrier presence) signal is a detection signal output from the carrier detection section 208 when a carrier is present whereas the CDI-OFF (carrier absence) signal is a detected signal output from the carrier detection section 208 when no carrier is present.

Where a roll-off filter having a high roll-off ratio such as 15%, 50% or 100% is employed, the convergence of the waveform response is rapid and the time width of the waveform response of the roll-off filter 207 is approximately 10 symbols (one symbol requires one modulation time), as shown in FIG. 15(a). Further, the dispersion time width of the CDI-ON/OFF signal, which is a detection signal from the carrier detection section 208, is approximately 5 symbols, as shown in FIG. 15(b).

In recent years modems have been required to establish multiple point connection in addition to increasing the communication rate in order to reduce the cost of the circuit. To this end, it is an effective technique to divide a frequency band of a main channel into a plurality of bands to transmit a plurality of data by way of the same circuit. An apparatus which is used for modulation and demodulation of a signal communicated in a main channel having a plurality of frequency bands obtained by frequency division is called a multiple frequency modem.

When a main channel is divided into a plurality of bands in this manner, since adjacent frequencies with reduced band widths must necessarily be distinguished rigidly from each other, the frequency cutoff characteristic of the roll-off filter must necessarily be steep. To this end, the roll-off ratio of the roll-off filter of the multiple frequency modem is set very low (for example, 3 to 5%). When, for example, a roll-off filter, having a roll-off ratio of 4.5%, is used as the roll-off filter 207, the time width of the filter waveform response is approximately 60 symbols as shown in FIG. 16(a). Consequently, the dispersion time width of the CDI-ON/OFF signal, which is a detection signal from the carrier detection section 208, is approximately 30 symbols, as shown in FIG. 16(b).

Meanwhile, a modem is constructed such that, upon transmission of data, training data of a particular pattern are modulated and transmitted prior to transmission of the data. Such training data are demodulated by demodulation means. Further, initialization processing (training) of a reception section of the modulator and demodulator apparatus is performed using the demodulation training data.

Since the time required for such training (such time is called RS (request-to-send)—CS (clear-to-send) time) is approximately 18 symbols, the dispersion time width of the CDI-ON output of the carrier detection section 208 is important. In some cases, at a point in time when a carrier is detected by the carrier detection section 208, training data may not be received and a data reception condition may be established although initialization processing has not been performed as yet.

Further, when polling is performed, if the CDI-OFF output of the carrier detection section 208 disperses significantly so that the output is delayed, then a next carrier may not possibly be received normally.

SUMMARY OF THE INVENTION

It is an object of the present invention to provide a modulator and demodulator apparatus which can detect a carrier of a low roll-off ratio accurately and stably without a dispersion in detection time and data of a demodulation signal can be processed with certainty.

In order to attain the object described above, according to an aspect of the present invention, there is provided a modulator and demodulator apparatus, which comprises a modulator for modulating and transmitting data, and a demodulator for receiving and demodulating a receive signal to reproduce such data. The demodulator includes a carrier detector for detecting a carrier from a demodulation signal. Further, demodulator performs data processing sequence for the demodulation signal in accordance with a result of detection by the carrier detector. The demodulator means further includes a filter having a slow time axis response, provided at a stage preceding to the carrier detector so that the demodulation signal, which has passed the filter, is input to the carrier detector.

According to another aspect of the present invention, there is provided a modulator and demodulator apparatus wherein a signal is communicated in a main channel for main data and a secondary channel for secondary data obtained by frequency division. The apparatus comprises a modulator for modulating and transmitting main data and secondary data, and demodulator for receiving and demodulating a receive signal to reproduce such main data and secondary data, the demodulator includes a carrier detector for detecting a carrier from a demodulation signal and for performing a data processing sequence for the demodulation signal in accordance with a result of detection by the carrier detection unit. The demodulator means further includes a filter, having a characteristic wherein the time axis response is slow, provided at a stage preceding the carrier detection unit so that the demodulation signal which has passed the filter is input to the carrier detection units.

In either case, the carrier detector may include a power calculation means for calculating a power of the output of the filter, and a determination unit for comparing the power calculated by the power calculation unit with a threshold level and determining the presence of a carrier when the power exceeds the threshold value.

Preferably, the filter has a cosine square characteristic.

According to a further aspect of the present invention, there is provided a modulator and demodulator apparatus, which comprises a modulator, for modulating and transmitting data, and a demodulator for receiving and demodulating a receive signal to reproduce such data. The modulator includes a tone signal generation unit means for adding a tone signal to the last end of a turnoff sequence of the data to be transmitted.

According to a still further aspect of the present invention, there is provided a modulator and demodulator apparatus, wherein a signal is communicated in a plurality of main channels for a plurality of main data and a secondary channel for secondary data obtained by frequency division, which comprises a modulator for modulating and transmitting main data and secondary data, and a demodulator for receiving and demodulating a receive signal to reproduce such main data and secondary data. The modulator includes tone signal generation unit for adding a tone signal to the last end of a turnoff sequence of the data to be transmitted.

In either case, preferably the tone signal is a single tone signal of a carrier frequency.

With the modulator and demodulator apparatus of the present invention, the following effects or advantages can be achieved.

1. Since a filter having a characteristic wherein the time axis response is slow is disposed at a stage preceding to the carrier detection means, the time width of the filter waveform response is reduced to become very short. Consequently, since the dispersion time width of the result of detection by the carrier detection unit can be reduced to be very short, even with a carrier whose roll-off ratio is very low, training data from the transmission side can be received with certainty. Therefore, data processing sequence for a demodulation signal, such as initialization processing using the training data, can be performed accurately and with certainty.

2. Since a tone signal is added to the last end of a turnoff sequence of transmission data, by the tone signal generation unit in the transmission side modem, the tone signal is not cut even when the receive signal which includes the tone signal, passes a filter having a characteristic wherein the time axis response is slow. Accordingly, detection of the absence of a carrier by the carrier detection unit can be performed accurately and the data can be received through the last end thereof with certainty.

Further objects, features and advantages of the present invention will become apparent from the following detailed description when read in conjunction with the accompanying drawings. In the drawing, like parts or elements are denoted by like reference characters.

BRIEF DESCRIPTION OF THE DRAWINGS

FIG. 16(a) is a first waveform diagram illustrating the time width of the filter waveform response and the dispersion time width of a CDI-ON/OFF signal of a multiple frequency modem; and FIG. 16(b) is a second waveform diagram illustrating the time width of the filter waveform response and the dispersion time width of a CDI-ON/OFF signal of a multiple frequency modem.

DESCRIPTION OF THE PREFERRED EMBODIMENT a. Principle of the Present Invention Prior to description of a preferred embodiment of the present invention, the principle of the present invention will be described first.

Figure 1:
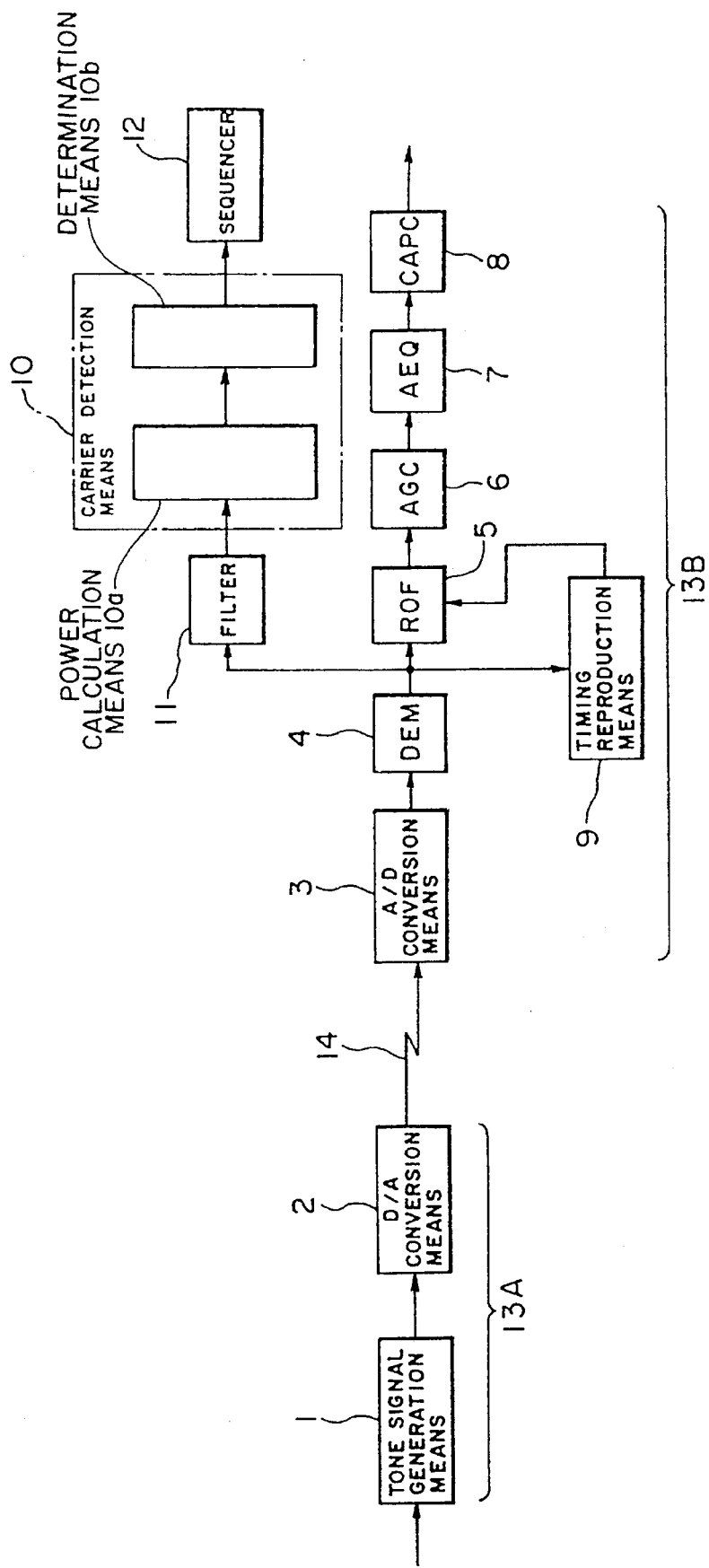
FIG. 1 is a block diagram illustrating the principle of the present invention.

FIG. 1 illustrates using a block diagram, the principle of a modulator and demodulator apparatus to which the present invention is applied. Referring to FIG. 1, the modulator and demodulator apparatus includes a tone signal generation unit 1 provided in a transmission side modem 13A for generating a tone signal such as, for example, a single tone signal of a carrier frequency and adding the tone signal to the last end of a turnoff sequence of data to be transmitted (transmission data). The data, including the tone signal, are transmitted to a reception side modem 13B by way of an analog circuit or transmission line 14.

The transmission side modem 13A includes, in addition to a tone signal generation unit 1, a digital to analog (D/A) converter 2 for converting digital data in a modulated condition (including such tone signal as described above) into analog data.

The reception side modem 13B includes an analog to digital (A/D) converter 3 for converting analog data received from the transmission side modem 13A into digital data, a demodulation unit 4 for demodulating a signal after conversion into digital data by the analog to digital converter 3, and a roll-off filter (ROF) 5 for applying band separation processing to the digital demodulation signal from the demodulator 4.

The reception side modem 13B further includes an automatic gain control unit (AGC) 6 for adjusting the loop gain so that the level of a demodulation signal from the roll-off filter 5 may be a predetermined reference value and outputting the demodulation signal of the adjusted level. Additionally, included is an equalizer (AEQ) 7 for processing a receive signal by equalization processing, a carrier phase correction unit 8 for correcting the phase of a carrier, and a timing reproduction unit 9 for leading in a signal timing from the demodulator 4, determining where the signal timing is present and outputting a result of the determination. The output of the timing reproduction means 9 is supplied to the roll-off filter 5.

The reception side modem 13B further includes a carrier (CD) detection unit 10 for detecting a carrier from a digital demodulator signal from the demodulation 4 and a filter 11 interposed between the carrier detection unit 10 and the demodulator 4, i.e. at a stage preceding to the carrier detection unit 10. This filter has a characteristic wherein the time axis response is slow such as, for example, a cosine square characteristic.

The carrier detection unit 10 includes a power calculation unit 10a for calculating the power of the output of the filter 11, and a determination unit 10b for comparing with the power calculated by the power calculation unit 10a with a predetermined threshold level and determining the presence of a carrier when the power exceeds the predetermined threshold level.

In the modulator and demodulator apparatus described above, upon transmission of data, a tone signal such as, for example, a single tone signal of a carrier frequency, is added by the transmission side modem 13A to the last end of a turnoff sequence of data to be transmitted. The transmission data, with the tone signal added thereto, are converted into an analog signal by the digital to analog converter 2 and then transmitted to the reception side modem 13B by way of the analog circuit or transmission line 14.

Then, in the reception side modem 13B, a digital demodulation signal from the demodulator 4 is input to the carrier detection unit 10 by way of the filter 11 having, for example, a cosine square characteristic but without passing the roll-off filter 5. In this instance, since the digital demodulation signal passes the filter 11 having a characteristic wherein the time axis response is slow, the time width of the filter waveform response is reduced to be short, and consequently, the convergence occurs rapidly.

In the carrier detection unit 10, the power calculation unit 10a calculates the power of the output of the filter 11, compares a result of the calculation with the predetermined threshold level, and determines, when the result of the calculation exceeds the predetermined threshold level, the presence of a carrier and outputs a CDI-ON (carrier presence) signal to the sequencer 12.

When where the filter 11 having a characteristic wherein the time axis response is slow is employed, since data which can pass the filter 11 are limited to only those of a particular frequency band, the power (energy) may be reduced to zero depending upon the data pattern. Although data are transmitted, the CDI signal from the carrier detection unit 10 may possibly be set as a CDI-OFF (carrier absence) signal, resulting in a drop of a last portion of the data. However, since a tone signal is added to the last end of a turnoff sequence of transmission data by the tone signal generation unit 1, the power will not be reduced to zero until transmission of the transmission data is completed.

Accordingly, with the modulator and demodulator apparatus of the present invention, the following effects or advantages can be achieved.

1. Since a filter having a characteristic wherein the time axis response is slow is disposed at a stage preceding to the carrier detection unit, the time width of the filter waveform response is reduced to be very short. Consequently, since the dispersion time width of a result of detection by the carrier detection unit can be reduced to be very short even with a carrier whose roll-off ratio is very low, training data from the transmission side can be received with certainty, and a data processing sequence for a demodulation signal such as initialization processing using the training data can be performed accurately and with certainty.

2. Since a tone signal is added to the last end of a turnoff sequence of transmission data by the tone signal generation unit in the transmission side modem, the tone signal is not cut even when the receive signal including the tone signal passes a filter having a characteristic wherein the time axis response is slow. Accordingly, detection of absence of a carrier by the carrier detection means can be performed accurately and the data can be received to the last end thereof with certainty.

b. Description of the Embodiment

Figure 2:
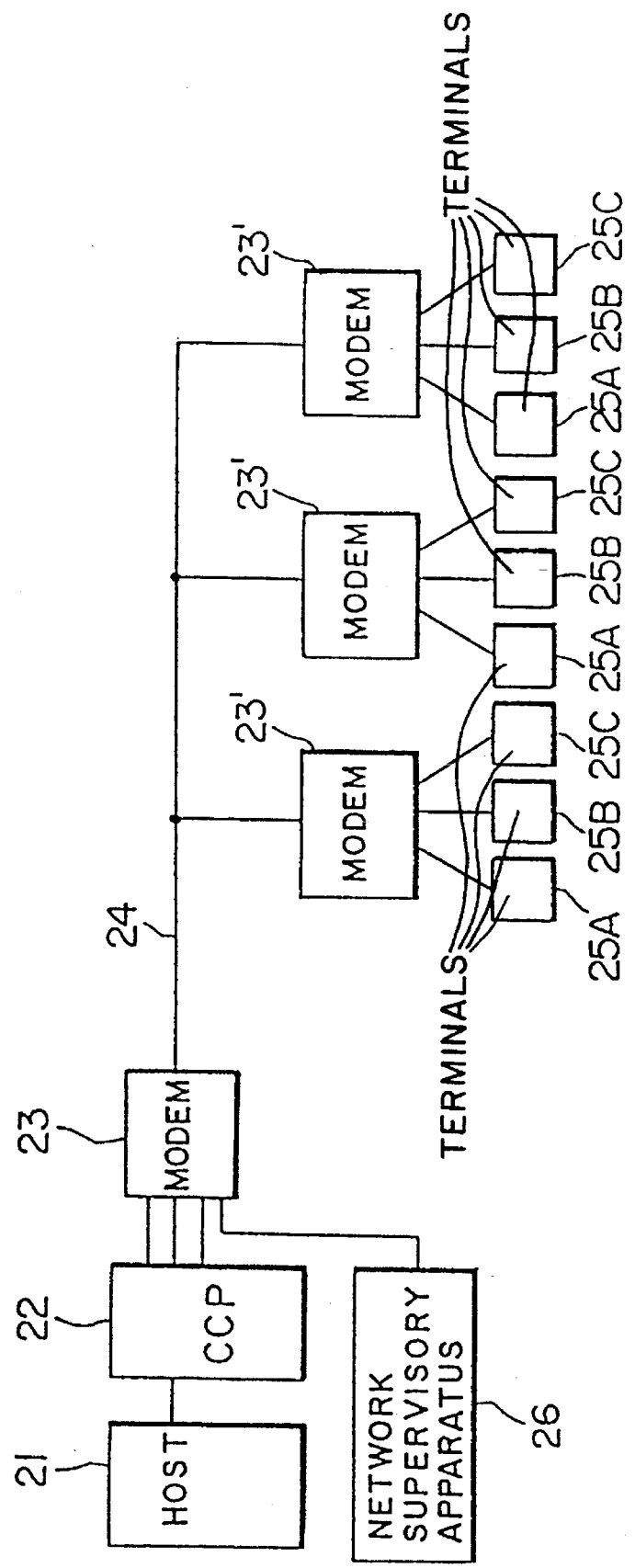
FIG. 2 is a block diagram of an on-line system to which the present invention is applied.

Now, a first preferred embodiment of the present invention is described in detail. Referring first to FIG. 2, there is shown an on-line system to which the present invention is applied. The on-line system shown includes a modem 23 connected to a host computer 21 by way of a communication control apparatus (CCP) 22, serving as a parent station. A plurality of modems 23' are connected to the modem 23 by way of an analog circuit or transmission line 24. The modems 23' are installed at different locations from the modem 23 and each serves as a child station. A plurality of terminals 25A to 25C are connected to each modem 23'. The on-line system further includes a network supervisory apparatus 26.

Figure 5:
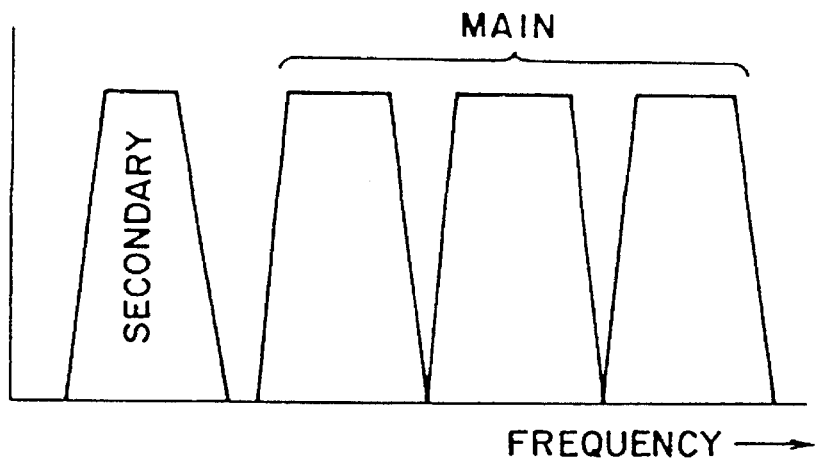
FIG. 5 is a diagram showing frequency bands of a main channel and a secondary channel used in the on-line system of FIG. 2.

Each of the modems 23 and 23' divides a voice band, for example, into three channels for main three main data and a secondary channel for secondary data for network supervision "as seen in FIG. 5" by frequency division. Then, each modulates and transmits data (main data and secondary data), demodulating, upon reception, a receive signal to reproduce data (main data and secondary data). Thus, as shown in FIG. 2, the child station modems 23' can be connected by multi-point connection to the parent station modem 23 by way of the common analog circuit or transmission line 24.

Figure 3:
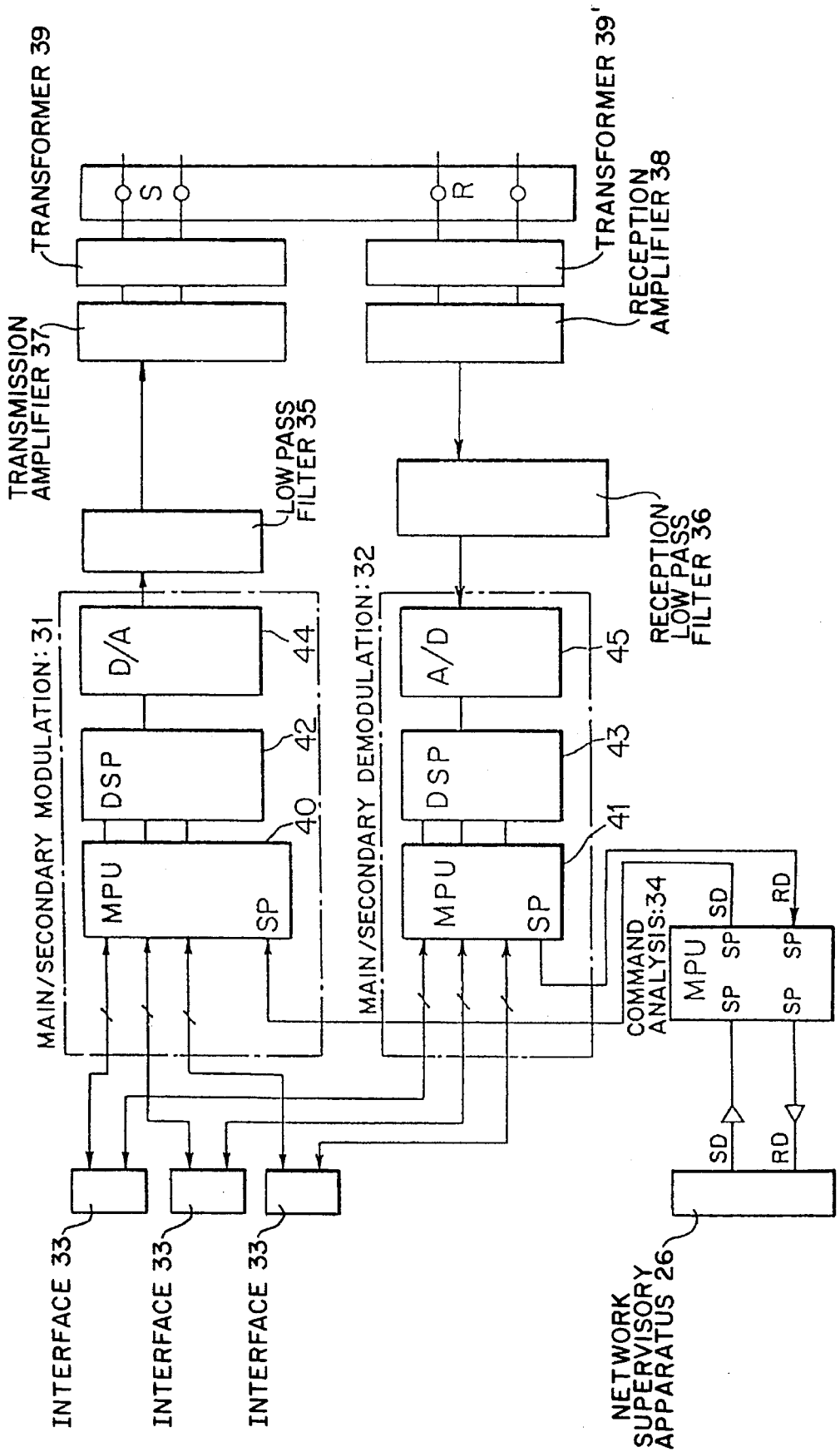
FIG. 3 is a block diagram of an essential part of a modem employed in the on-line system shown in FIG. 2 and showing a preferred embodiment of the present invention.

Referring now to FIG. 3, in order for the modem 23 to exhibit such functions as described just above, the modem includes a main/secondary modulation section 31 and a main/secondary demodulation section 32. Further, the modem includes a plurality of interface sections 33 for interfacing with the communication control apparatus 22, and a command analysis section 34 interposed between the modem 23 and the network supervisory apparatus 26. The modem 23 further includes a transmission low-pass filter 35, a reception low-pass filter 36, a transmission amplifier 37, a reception amplifier 38 and a pair of transformers 39 and 39'.

Each of the interface sections 33 connects the communication control apparatus 22 and the modem 23 to each other with a synchronous interface (RS232C). The command analysis section 34 performs an analysis of a command from the network supervisory apparatus 26 and produces a response to the network supervisory apparatus 26. Additionally, it has a function of transferring transmission or reception data SD or RD by way of serial ports SP thereof by high speed serial transfer. Further, the command analysis section 34 connects the network supervisory apparatus 26 and the modem 23 to each other with a start-stop interface (RS485).

The main/secondary modulation section 31 includes a microprocessor unit (MPU) 40, a digital signal processor (DSP) 42 and a digital to analog (D/A) converter 44. The main/secondary demodulation section 32 includes an MPU 41, a DSP 43 and an analog to digital (A/D) converter 45. The number of MPUs and DSPs comprising the main/secondary modulation section 31 and the main/secondary demodulation section 32 may individually be provided depending upon the capacity or processing faculty of the modem 23.

Figure 4:
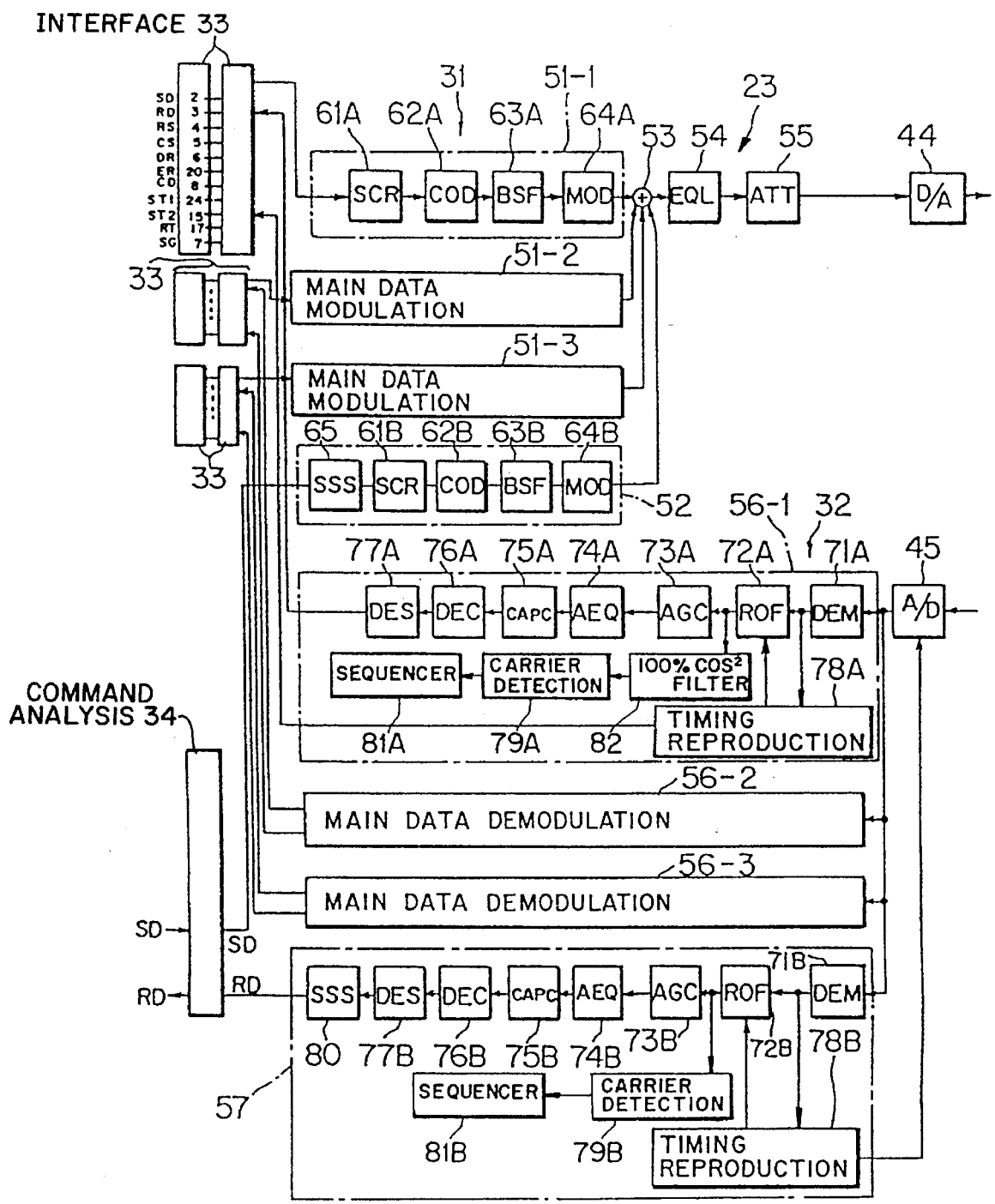
FIG. 4 is a block diagram showing details of the modem shown in FIG. 3.

Now, an essential part of the modem 23 will be described in more detail. Referring now to FIG. 4, the modem 23 includes, in the main/secondary modulation section 31, three main data modulation sections 51-1, 51-2 and 51-3 and a secondary data modulation section 52 as well as an addition section 53, a fixed equalizer 54 (EQL) and a transmission attenuator (ATT) 55.

The main data modulation sections 51-1 to 51-3 modulate main data and are provided by a number equal to the number of channels, in this example, 3. Each of the main data modulation sections 51-1 to 51-3 includes a scrambler (SCR) 61A, a code conversion section (COD) 62A, a transmission base band filter (BSF) 63A and a modulation section (MOD) 64A. While the detailed construction is shown only for the main data modulation section 51-1 in FIG. 4, also the other main data modulation sections 51-2 and 51-3 have the same construction as described above.

Here, the scrambler 61A scrambles a signal into a random signal, and the code conversion section 62A performs desired code conversion for the output of the scrambler 61A. Upon such code conversion, the code conversion section 62A generates a signal point having a desired eye pattern (data point plot pattern on a phase plane).

The transmission base band filter 63A passes a base band component of a digital output of the code conversion section 62A, and the modulation section 64A modulates the output of the base band filter 63A with a corresponding main channel frequency.

Meanwhile, the secondary data modulation section 52 modulates secondary data. The secondary data modulation section includes a start-stop synchronization conversion section (SSS) 65, a scrambler (SCR) 61B, a code conversion section (COD) 62B, a transmission base band filter (BSF) 63B, and a modulation section (MOD) 64B.

Here, the start-stop synchronization conversion section 65 performs conversion processing from a start-stop interface to a synchronization interface. The scrambler 61B, the code conversion section 62B, the transmission base band filter 63B and the modulation section 64B have similar functions to those of the scrambler 61A, the code conversion section 62A, the transmission base band filter 63A and the modulation section 64A, respectively. The modulation frequency at the modulation section 64B is the secondary channel frequency.

Additionally, the transmission MPU 40, shown in FIG. 3, has the functions of the scramblers 61A and the code conversion sections 62A of the main data conversion sections 51-1 to 51-3 and the start-stop synchronization conversion section 65, the scrambler 61B and the code conversion section 62B of the secondary data conversion section 52. The transmission DSP 42 shown in FIG. 3 has the functions of the transmission base band filters 63A and the modulation sections 64A of the main data conversion sections 51-1 to 51-3, the base band filter 638 and the modulation section 64B of the secondary data conversion section 52, the addition section 53, the fixed equalizer 54 and the transmission attenuator 55.

Further, the modem 23 includes, in the main/secondary demodulation section 32, three main data demodulation sections 56-1, 56-2 and 56-3 and a secondary data demodulation section 57.

The main data demodulation sections 56-1 to 56-3 demodulate main data and are provided also by a number equal to the number of channels, in this example, 3. Each of the main data demodulation sections 56-1 to 56-3 includes a demodulation section 71A, a roll-off filter (band separation filter; ROF) 72A, an automatic gain control section (AGC) 73A, an automatic equalization section (AEQ) 74A, a carrier phase correction section (CAPC) 75A, a code conversion section (DEC) 76A and a descrambler (DES) 77A as well as a timing reproduction section 78A, a carrier detection section 79A, a sequencer 81A and a 100% $\cos^2$ filter 82. While detailed construction is shown only of the main data demodulation section 56-1 in FIG. 4, the other main data demodulation sections 56-2 and 56-3 have the same construction as described above.

The demodulation section 71A applies demodulation processing to a receive signal after digital conversion by the A/D converter 45. The roll-off filter 72A passes only a signal of a predetermined frequency range of the digital output of the demodulation section 71A. A transversal filter is used for the demodulation section 71A. Further, where the main channel is divided into a plurality of (three) channels as in the present embodiment, the frequency cut-off characteristic of the roll-off filter 72A must necessarily be set steep from the necessity to narrow the band widths to make a rigid distinction between each of the adjacent frequencies. The roll-off rate (ROF rate) of the roll-off filter 72A is set low (for example, to 3 to 5% or so).

The automatic gain control section 73A constitutes an automatic receive level adjustment unit for adjusting the loop gain so that the level of the demodulation signal band-limited by the roll-off filter 72A may be equal to a predetermined reference value and inputting the demodulation signal to the automatic equalization section 74A at the next stage. The automatic gain control section 73A is required to allow the automatic equalization section 74A at the next stage to operate accurately.

The automatic equalization section 74A performs equalization processing for correcting a transmission distortion, etc. of the circuit. Moreover, the carrier phase correction section 75A corrects the phase of a carrier from the output of the automatic equalization section 74A.

The code conversion section 76A decodes a coded signal of the output of the carrier phase correction section 75A. The descrambler 77A descrambles an output of the code conversion section 76A, which is in a scrambled condition as a result of processing at the scrambler 61A in the main/secondary modulation section 31, back into an original signal.

The timing reproduction section 78A extracts a signal timing from the output of the demodulation section 71A and determines where a signal timing is present. The output of the timing reproduction section 78A is supplied to the roll-off filter 72A and the corresponding interface circuit 33.

The carrier detection section (CD detection section) 79A detects a carrier from the output (the digital demodulation signal) of the demodulation section 71A to detect whether data have been received. The output (CDI-ON/OFF) of the carrier detection section 79A is supplied to the sequencer 81A and thus provides trigger information to the sequencer 81A. When a carrier detection (CDI-ON/OFF) signal is received as trigger information from the carrier detection section 79A, the sequencer 81A performs control of a demodulation processing operation (data processing sequence).

In the present embodiment, the 100% $\cos^2$ filter 82 is provided at a stage preceding to the carrier detection section 79A so that the digital demodulation signal from the demodulation section 71A may be input to the carrier detection section 79A after passing the 100% $\cos^2$ filter 82. The 100% $\cos^2$ filter 82 has a cosine square characteristic wherein the time axis response is slow as illustrated, for example, in FIG. 6.

Meanwhile, the secondary data demodulation section 57 demodulates secondary data and includes a demodulation section (DEM) 71B, a roll-off filter (band separation filter; ROF) 72B, an automatic gain control section (AGC) 73B, an automatic equalization section (AEQ) 74B, a carrier phase correction section (CAPC) 75B, a code conversion section (DEC) 76B, a descrambler section (DES) 77B, and a synchronization to start-stop conversion section (SSS) 80 as well as a timing reproduction section 78B, a carrier detection section (CD detection section) 79B, and a sequencer 81B.

The synchronization to start-stop conversion section 80 performs conversion processing from a synchronization interface to a start-stop interface. The demodulation section 71B, the roll-off filter 72B, the automatic gain control section 73B, the automatic equalization section 74B, the carrier phase correction section 75B, the code conversion section 76B, the descrambler section 77B, the timing reproduction section 78B, the carrier detection section 79B and the sequencer 81B have similar functions to those of the demodulation section 71A, the roll-off filter 72A, the automatic gain control section 73A, the automatic equalization section 74A, the carrier phase correction section 75A, the code conversion section 76A, the descrambler section 77A, the timing reproduction section 78A, the carrier detection section 79A and the sequencer 81A, respectively.

However, the roll-off filter 72B of the secondary data demodulation section 57 need not necessarily have a steep frequency cut-off characteristic, since the secondary channel is not divided any more. Accordingly, the roll-off rate (ROF rate) of the roll-off filter 72B is set high compared to the roll-off filters 72A for the main channels, for example, to 30 to 40%.

Meanwhile, in the secondary data demodulation section 57, since the roll-off ratio of the roll-off filter 72B is high as described hereinabove, the CDI-ON/OFF (carrier presence/absence) output of the carrier detection section 79B does not disperse very much. Accordingly, the carrier detection section 79B detects a carrier from the output of the roll-off filter 72B similarly as in a conventional modulator and demodulator apparatus.

Meanwhile, the timing reproduction section 78B of the secondary data demodulation section 57 extracts a signal timing from the output of the demodulation section 71B and determines where a signal timing is present. Then, the output of the timing reproduction section 78B is supplied to the roll-off filter 72B and the A/D converter 45. Accordingly, the frequency timing of the secondary data is used as a sampling timing for a digital value by the A/D converter 45. So that the ROF rate in the main channels is so low, that it is difficult to extract a timing component from any of the main channels.

It is to be noted that the reception DSP 43, shown in FIG. 3, has the functions of the demodulation sections 71A, the roll-off filters 72A, the automatic gain control sections 73A, the automatic equalization sections 74A, the carrier phase correction sections 75A, the timing reproduction sections 78A, the carrier detection sections 79A and the 100% $\cos^2$ filter 82 of the main data demodulation sections 56-1 to 56-3 and the demodulation section 71B, the roll-off filter 72B, the automatic gain control section 73B, the automatic equalization section 74B, the carrier phase correction section 75B, the timing reproduction section 78B and the carrier detection section 79B of the secondary data demodulation section 57. The reception MPU 41 shown in FIG. 3 has the functions of the code conversion sections 76A, the descramblers 77A and the sequencers 81A of the main data demodulation sections 56-1 to 56-3 and the code conversion section 76B, the descrambler 77B, the synchronization to start-stop conversion section 80 and the sequencer 81B of the secondary data demodulation section 57.

Also, the modems 23' serving as child stations have substantially the same construction as the modem 23 which serves as the parent station. Further, in FIG. 4, illustration of the detailed construction as described below with reference to FIG. 6 is omitted.

In the present embodiment, when main data and secondary data are to be transmitted in a plurality of main channels and a secondary channel obtained by frequency division, respectively, a tone signal such as, for example, a single tone signal of a carrier frequency is added to the last end of a turnoff sequence (scrambler Z) of the transmission data by the code conversion sections 62A in the transmission circuits for the main channels.

Figure 7:
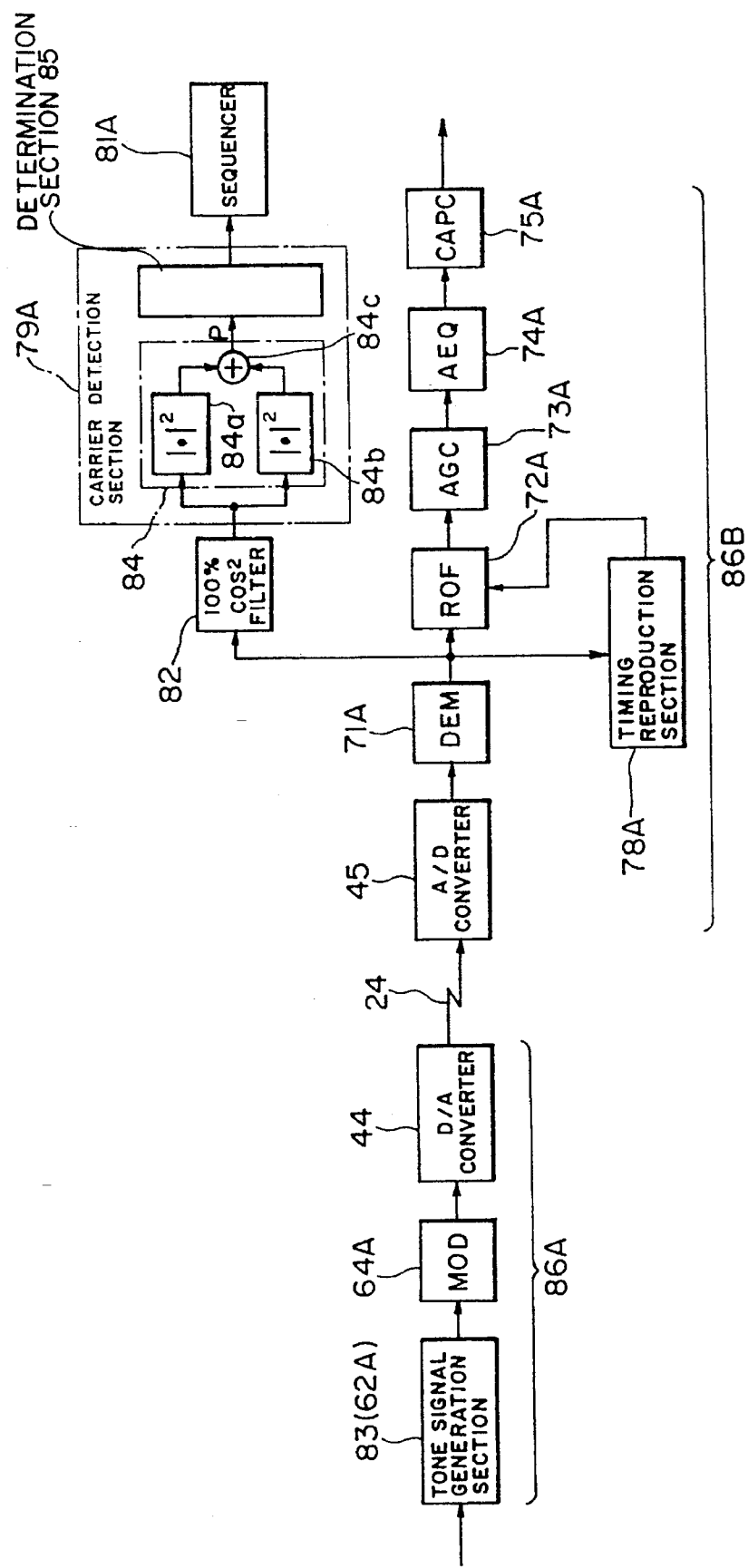
FIG. 7 is a block diagram showing a somewhat detailed construction of part of the modem of FIG. 3.
Figure 8:
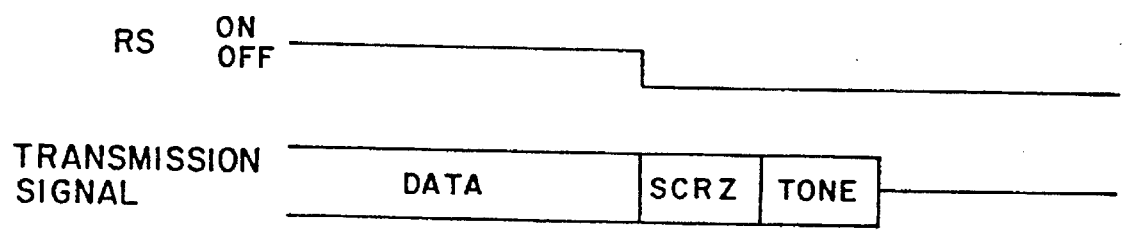
FIG. 8 is a waveform diagram illustrating a tone signal added on the transmission side in the on-line system of FIG. 2.

Referring to FIG. 7, there is shown essential part of the modulator and demodulator apparatus of the present embodiment. In FIG. 7, like reference characters to those of FIG. 4 denote like elements, and description thereof is omitted herein to avoid redundancy. A transmission side modem 86A of the modulator and demodulator apparatus shown includes a tone signal generation section 83 which generates a tone signal such as, for example, a single tone signal of a carrier frequency and adds the tone signal to the last end of a turnoff sequence (SCRZ: scrambler Z) of data to be transmitted as seen from FIG. 8. For example, the code conversion section 62A of the modem 23 shown in FIG. 4 has a function corresponding to the tone signal generation section 83.

Figure 6:
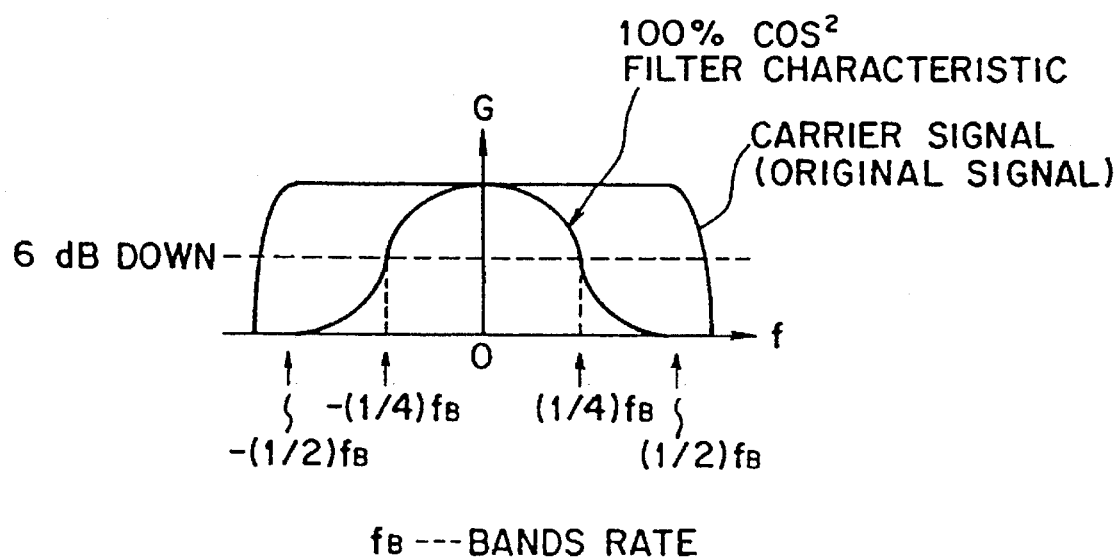
FIG. 6 is a graph illustrating a characteristic of a 100% $\cos^2$ filter shown in FIG. 4.

On the other hand, a reception side modem 86B of the modulator and demodulator apparatus includes, at a stage preceding to the carrier detection section 79A, a 100% $\cos^2$ filter 82 having such a characteristic as illustrated in FIG. 6 so that a digital demodulation signal from the demodulation section 71A may be inputted to the carrier detection section 79A after passing the 100% $\cos^2$ filter 82.

The carrier detection section 79A includes a power calculation section 84 for calculating the power of the vector output of the 100% $\cos^2$ filter 82, and a determination section 85 for comparing the power calculated by the power calculation section 84 with a predetermined threshold level and determining presence of a carrier when the power exceeds the predetermined threshold level.

Here, the power calculation section 84 includes a pair of absolute value square calculation sections 84a and 84b for taking and squaring absolute values of components X and Y of the vector output of the 100% $\cos^2$ filter 82, respectively, and an adder 84c for adding values from the absolute value square calculation sections 84a and 84b and outputting the sum. Detailed determination operation of the determination section 85 will be hereinafter described in detail with reference to FIG. 9.

With the modulator and demodulator apparatus of the construction described above, upon transmission, main data are modulated in the respective main channels by the main data conversion sections 51-1 to 51-3 while secondary data are modulated in the secondary channel by the secondary data modulation section 52, and the outputs of the modulation sections 51-1 to 51-3 and 52 are added by the adder 53 and then successively processed by required processing by the fixed equalizer 54 and the transmission attenuator 55. The output of the transmission attenuator 55 is converted into an analog signal by the analog to digital converter 44 and sent into the analog circuit 24.

In this instance, a tone signal such as, for example, a single tone signal of a carrier frequency generated by the tone signal generation means 83 is added to the last end of a turnoff sequence (scrambler Z) of the data to be transmitted as seen from FIG. 8(b) by code conversion by the code conversion section 62A of each of the main data modulation sections 51-1 to 51-3. The transmission data with the tone signal added thereto are modulated by the modulation section 64A and then converted into an along signal by the digital to analog converter 44, whereafter they are transmitted to the transmission side modem 86B by way of the analog circuit or transmission line 24.

Then, in the reception side modem 86B, a receive signal from the transmission side modem 86A is converted from an analog signal into a digital signal by the analog to digital converter 45, and the reception digital signal is processed by demodulation processing by the demodulation section 71A. The digital demodulation signal obtained by demodulation processing of the demodulation section 71A is input to the roll-off filter 72A so that it is thereafter processed by similar processing as in a conventional modulator and demodulator apparatus. Meanwhile, the digital demodulation signal from the demodulation section 71A is input also to the 100% $\cos^2$ filter 82. Then the digital demodulation signal, having passed the 100% $\cos^2$ filter 82, is input to the carrier detection section 79A.

In the carrier detection section 79A, the absolute value square calculation sections 84a and 84b calculates squared values of absolute values of the components X and Y of the vector output of the 100% $\cos^2$ filter 82, respectively. The adder 84c adds the values from the absolute value square calculation sections 84a and 84b. The output P of the adder 84c is input as a power (energy value) of the output from the 100% $\cos^2$ filter 82 to the determination section 85.

Figure 9:
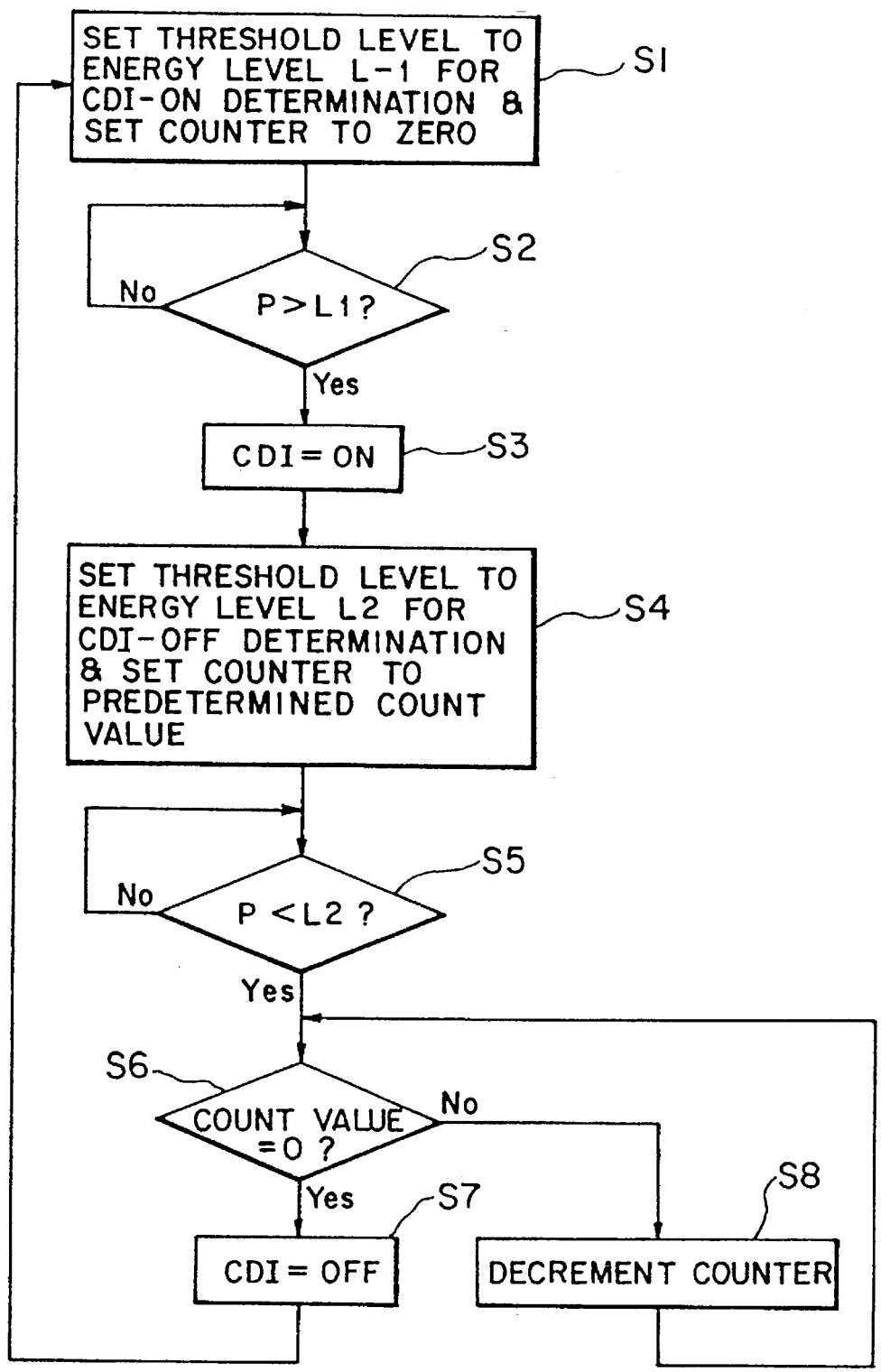
FIG. 9 is a flow chart illustrating operation of a determination section shown in FIG. 7.

Determination operation of the determination section 85 proceeds in such a procedure as illustrated, for example, in FIG. 9. In particular, a threshold level (energy level) L1 for determination of the CDI-ON (presence of a carrier) signal and another threshold level (energy level) L2 for determination of the CDI-OFF (absence of a carrier) are determined in advance. Referring to FIG. 9, the threshold level of the determination section 85 is first set to the energy level L1 for determination of the CDI-ON (carrier presence) and a counter (not shown) in the determination section 85 is reset to zero (step S1).

Then, the determination section 85 compares the output P of the power calculation section 84 with the energy level L1 (step S2). If P>L1 is determined, then the determination section 85 determines that a carrier is detected and sets the output CDI (carrier) thereof to the CDI-ON (carrier presence) (step S3). Then, the determination section 85 changes over the threshold level to the energy level L2 for determination of the CDI-OFF (carrier absence) and places the predetermined count value into the counter (step S4).

After the counter is set to the predetermined count value in this manner, the CDI-ON (carrier presence) signal of the carrier detection section 85 will be maintained until the count value of the counter is reduced to zero by repeating a decrementing operation of the counter by one at step S8 which will be hereinafter described. Consequently, in the present embodiment, the CDI-OFF (absence of a carrier) determination processing of the determination section 85 is delayed by an interval of time corresponding to a signal delay in the inside of the digital signal processor (DSP) 43.

After the CDI output of the determination section 85 changes over to the CDI-ON (carrier presence), the determination section 85 compares the output P of the power calculation section 84 with the energy level L2 (step S5). If it determines P<L2, then it determines that a carrier cannot be detected any more and repeats such comparison at step S5. After the output P of the power calculation section 84 changes so that the determination section 85 determines P≧L2, the determination section 85 determines whether or not the count value of the counter is equal to zero as described above (step S6). Thus, until after the count value of the counter is reduced to zero, the carrier detection section 79A maintains its output CDI-ON (carrier presence). In particular, if the count value is zero at step S6, then the output CDI of the carrier detection 79A is changed over to the signal CDI-OFF (carrier absence) (step S7), whereafter the control sequence returns to step S1, but on the contrary if the count value is not zero, the counter is decremented by one at step S8, and then the control sequence returns to step S6.

Figure 10A:
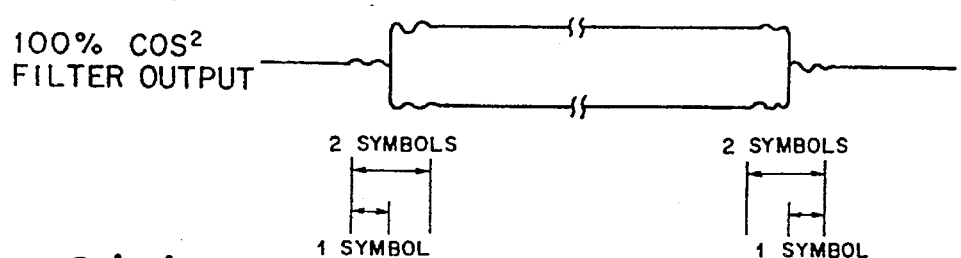
FIG. 10(a) is a first waveform diagram illustrating the time width of the filter waveform response and the dispersion time width of a CDI-ON/OFF signal of the modem shown in FIG. 4.
Figure 10B:
FIG. 10(b) is a second waveform diagram illustrating the time width of the filter waveform response and the dispersion time width of a CDI-ON/OFF signal of the modem shown in FIG. 4.

In this manner, with the modulation and demodulation system of the present embodiment, since a digital demodulation signal from the demodulation section 71A is input to the carrier detection section 79A through the 100% $\cos^2$ filter 82 without passing the roll-off filter 72A, the time width of the filter waveform response can be reduced to two symbols or so as seen from FIG. 10(a) (to accelerate convergence). The dispersion time width of the CDI-ON/OFF signal, which is a detection signal from the carrier detection signal 79A, can be reduced remarkably to one symbol or so as seen from FIG. 10(b).

Consequently, even a carrier whose roll-off ratio is low can be detected with a high degree of accuracy by the carrier detection section 79A without a dispersion in detection time. Accordingly, training data from the transmission side can be received accurately and a data processing sequence of a demodulation signal such as initialization processing using the training data can be performed with certainty. Further, since the dispersion time width of the CDI-OFF (carrier absence) detection output of the carrier detection section 79A is reduced to be very short, the disadvantage that, when polling is performed, a next carrier cannot be received normally "as in a conventional modulator and demodulator apparatus" can be eliminated.

Figure 11:
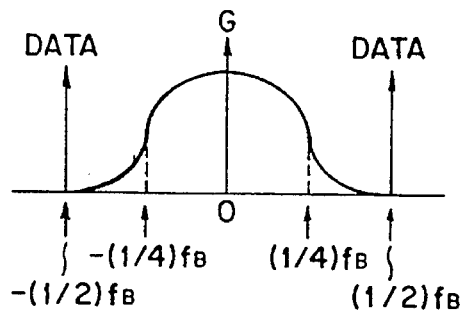
FIG. 11 is a diagram illustrating a data pattern when the power is reduced to zero due to the characteristic of the 100% $\cos^2$ filter shown in FIG. 4.
Figure 12:
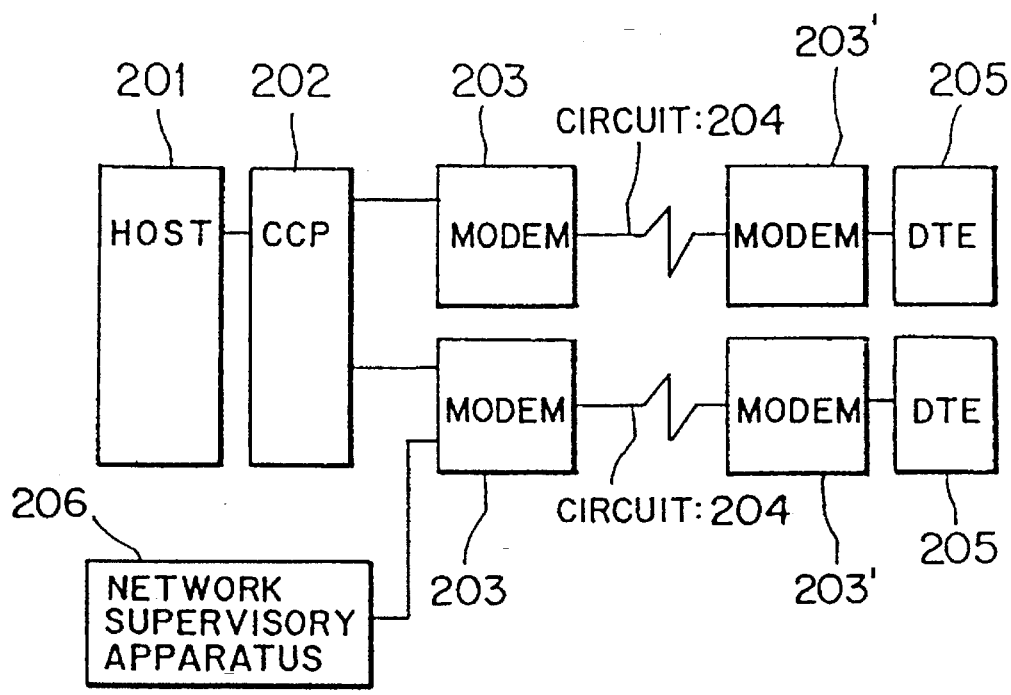
FIG. 12 is a block diagram showing an on-line system.
Figure 13:
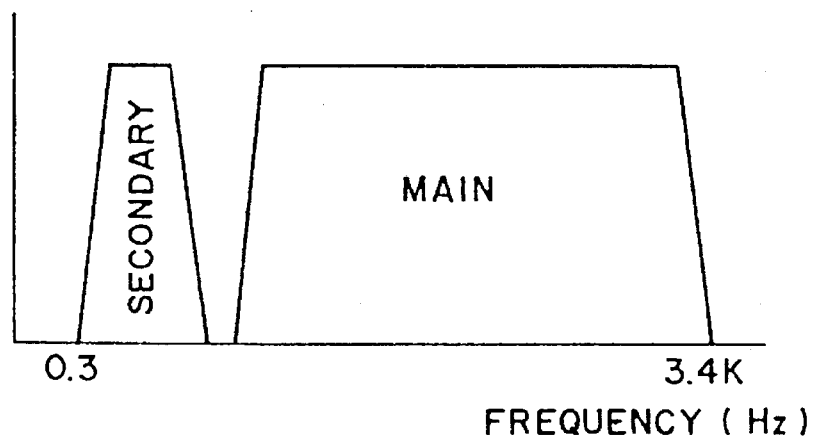
FIG. 13 is a diagram showing frequency bands of a main channel and a secondary channel used in the on-line system shown in FIG. 12.
Figure 14:
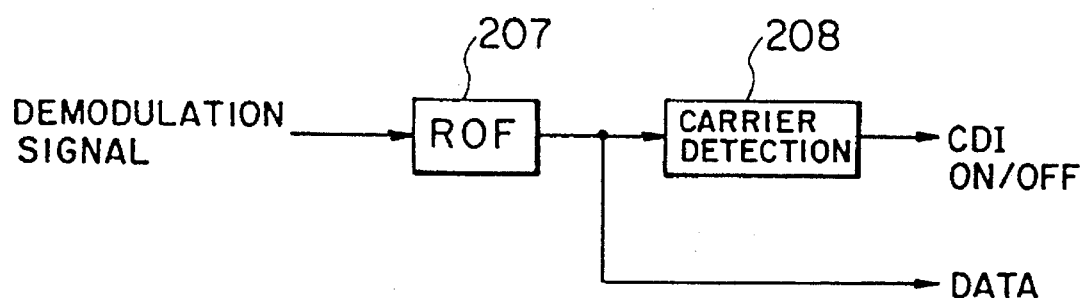
FIG. 14 is a block diagram showing a carrier detection section of a modulator and demodulator apparatus employed in the on-line system of FIG. 12.
Figure 15A:
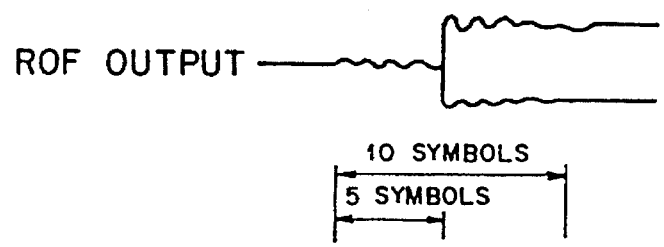
FIG. 15(a) is a first waveform diagram illustrating the time width of the filter waveform response and the dispersion time width of a CDI-ON/OFF signal of the carrier detection section of FIG. 14.
Figure 15B:
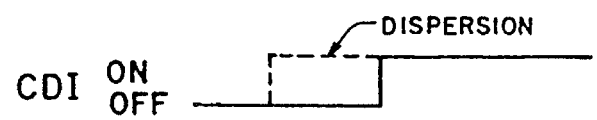
FIG. 15(b) is a second waveform diagram illustrating the time width of the filter waveform response and the dispersion time width of a CDI-ON/OFF signal of the carrier detection section of FIG. 14.

By the way, where a 100% $\cos^2$ filter having such a characteristic as illustrated in FIG. 6 is employed as the 100% $\cos^2$ filter 82, data which can pass the 100% $\cos^2$ filter 82 are reduced to those in one half of a data band. Accordingly, with such a data pattern as shown in FIG. 11, the power (energy) obtained at the power calculation section 84 is reduced to zero. In such an instance, the output CDI (carrier) of the carrier detection section 79A may possibly change over to OFF (carrier absence) before a carrier is actually lost, resulting in a drop of a last portion of the data.

In the present embodiment, however, since a tone signal is added to the last end of a turnoff sequence of transmission data by the tone signal generation section 83 of the transmission side modem 86A, the tone signal is not cut even when the receive signal passes the 100% $\cos^2$ filter 82, and consequently, the CDI-off (carrier absence) detection output of the carrier detection section 79A is provided with certainty and the data can be received to the last thereof with certainty.

While the present invention is applied, in the embodiments described above, to the multiple frequency modems wherein a frequency band of a main channel is divided into three bands, the application of the present invention is not limited to this, and the present invention can be applied similarly to modems which have a single main channel or employ a frequency band divided into a plurality of bands other than three.

The present invention is not limited to the specifically described embodiment, and variations and modifications may be made without departing from the scope of the present invention.

What is claimed is:

1. A modulator apparatus connectable via a transmission line to a demodulation apparatus, comprising:
    modulation means for modulating and originating data, said data having a turnoff sequence with a last end and said modulation means being coupled via the transmission line to the demodulation apparatus for receiving and demodulating a receive signal to reproduce the data, said modulation means including tone signal generation means for adding a tone signal to the last end of the turnoff sequence of the data to be transmitted.

2. A modulator and demodulator apparatus as claimed in claim 1, wherein the tone signal is a single tone signal of a carrier frequency.

3. A modulator, connectable via a transmission line to a demodulator apparatus, for use with signals communicated in a plurality of main channels for a plurality of main data and in a secondary channel for secondary data obtained by frequency division, comprising:
    modulation means for modulating and originating said main data and said secondary data as a transmitted signal, said main data and said secondary data having a turnoff sequence with a last end, said modulation means coupled via the transmission line to the demodulator apparatus for receiving and demodulating the transmitted signal to reproduce said main data and said secondary data, said modulation means including tone signal generation means for adding a tone signal to the last end of the turnoff sequence of said main data and said secondary data to be transmitted.

4. A modulator as claimed in claim 3, wherein the tone signal is a single tone signal of a carrier frequency.

* * * * *

UNITED STATES PATENT AND TRADEMARK OFFICE
CERTIFICATE OF CORRECTION

Page 1 of 2

PATENT NO. : 5,563,908
DATED : October 8, 1996
INVENTOR(S) : Takashi KAKU, et al.

It is certified that error appears in the above-indentified patent and that said Letters Patent is hereby corrected as shown below:

Col. 1,  line 9,   Delete "in"
         line 10,  after "and" insert --in--
         line 39,  change "provide" to --provides--
         line 61,  change "received, a" to --received.  A--

Col. 2,  line 13,  change "years" to --years,--

Col. 3,  line 7,   delete "means"
         line 20,  change "data, the" to --data.  The--
         line 30,  change "means" to --unit--
         line 41,  delete "means"
         line 52,  after "includes" insert --a--

Col. 4,  line 9,   change "signal" to --signal,--
         line 19,  change "drawing," to --drawings,--

Col. 6,  line 33,  delete "where"

Col. 7,
         line 18,  change ""as" to --(as--
                   change "5"" to --5)--

UNITED STATES PATENT AND TRADEMARK OFFICE
CERTIFICATE OF CORRECTION

PATENT NO. : 5,563,908
DATED : October 8, 1996
INVENTOR(S) : Takashi Kaku, et. al.

it is certified that error appears in the above-indentified patent and that said Letters Patent is hereby corrected as shown below:

Col. 10, line 40,  delete "It is to be noted that"
                   change "the" to --The--

Signed and Sealed this

Eleventh Day of February, 1997

Attest:

BRUCE LEHMAN

*Attesting Officer*   *Commissioner of Patents and Trademarks*